US012639057B2

(12) United States Patent
Agarwal et al.

(10) Patent No.: US 12,639,057 B2
(45) **Date of Patent: *May 26, 2026**

(54) COMPUTER MODEL MANAGEMENT SYSTEM

(71) Applicant: PayPal, Inc., San Jose, CA (US)

(72) Inventors: Anchika Agarwal, Singapore (SG);
Pushpinder Singh, Chennai (IN)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,307

(22) Filed: Oct. 6, 2023

(65) Prior Publication Data

US 2024/0176606 A1     May 30, 2024

Related U.S. Application Data

(63) Continuation of application No. 16/917,419, filed on Jun. 30, 2020, now Pat. No. 11,816,461.

(51) Int. Cl.
| | |
|---|---|
| *G06F 8/60* | (2018.01) |
| *G06F 8/71* | (2018.01) |
| *G06F 9/54* | (2006.01) |
| *G06F 11/34* | (2006.01) |
| *G06N 20/00* | (2019.01) |

(52) U.S. Cl.
CPC ................. *G06F 8/60* (2013.01); *G06F 8/71* (2013.01); *G06F 9/54* (2013.01); *G06F 11/3409* (2013.01); *G06N 20/00* (2019.01)

(58) Field of Classification Search
CPC ..... G06F 8/60; G06F 8/71; G06F 9/54; G06F 11/3409; G06N 20/00
See application file for complete search history.

(56) References Cited

U.S. PATENT DOCUMENTS

| | | | |
|---|---|---|---|
| 7,231,378 B2 | 6/2007 | Lawson et al. | |
| 8,341,617 B2 | 12/2012 | Bunn | |
| 8,543,620 B2 | 9/2013 | Ching | |
| 8,583,769 B1 | 11/2013 | Peters et al. | |
| 8,719,804 B2 * | 5/2014 | Jain ..................... | G06F 11/3495 |
| | | | 717/127 |
| 8,966,580 B2 | 2/2015 | Sela et al. | |
| 9,143,530 B2 * | 9/2015 | Qureshi ................ | H04L 9/0891 |

(Continued)

*Primary Examiner* — Douglas M Slachta

(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to a method that includes receiving, by a particular computer system included in an enterprise computer system, deployment instructions, from a user, for a particular version of a machine-learning model. One or more versions of the machine-learning model may be stored in a database. The particular computer system may select, based on the deployment instructions, a destination within the enterprise computer system for deploying the particular version. The selected destination may provide access to a particular data set. The particular computer system may schedule a deployment of the particular version from the database to the selected destination. The deployed version of the machine-learning model may operate on the particular data set. Performance data associated with operation of the deployed version of the machine-learning model is collected.

20 Claims, 9 Drawing Sheets

<u>600</u>

(56)  References Cited

U.S. PATENT DOCUMENTS

| | | | |
|---|---|---|---|
| 9,176,728 B1* | 11/2015 | Dixit | H04L 67/10 |
| 9,203,700 B2 | 12/2015 | Basoglu et al. | |
| 9,235,409 B1* | 1/2016 | Guo | G06F 8/65 |
| 9,239,937 B2* | 1/2016 | Erickson | G06F 21/73 |
| 9,349,024 B2 | 5/2016 | Fletcher et al. | |
| 9,996,804 B2 | 6/2018 | Bowers et al. | |
| 10,033,700 B2 | 7/2018 | Ouye et al. | |
| 10,089,108 B1 | 10/2018 | Noble | |
| 10,116,679 B1 | 10/2018 | Wu et al. | |
| 10,148,677 B2 | 12/2018 | Muddu et al. | |
| 10,621,019 B1* | 4/2020 | Faulhaber, Jr. | G06F 9/45558 |
| 10,713,594 B2* | 7/2020 | Szeto | G06N 20/00 |
| 10,990,850 B1* | 4/2021 | Chen | G06V 10/7747 |
| 11,301,762 B1* | 4/2022 | Chen | G06N 5/027 |
| 11,610,143 B1* | 3/2023 | Bhadauria | G06N 5/04 |
| 11,816,461 B2* | 11/2023 | Agarwal | G06F 9/54 |
| 12,293,260 B2* | 5/2025 | Kuo | G06N 5/04 |
| 2006/0064387 A1 | 3/2006 | Jose et al. | |
| 2006/0271928 A1 | 11/2006 | Gao et al. | |
| 2007/0016950 A1 | 1/2007 | Okamura et al. | |
| 2007/0168348 A1 | 7/2007 | Forsyth | |
| 2007/0169075 A1* | 7/2007 | Lill | G06F 8/65 714/E11.207 |
| 2008/0115124 A1 | 5/2008 | Remer | |
| 2008/0201702 A1 | 8/2008 | Bunn | |
| 2009/0024663 A1* | 1/2009 | McGovern | G06F 21/577 |
| 2010/0223213 A1* | 9/2010 | Su | G06F 9/5066 712/30 |
| 2011/0276951 A1 | 11/2011 | Jain | |
| 2012/0036552 A1 | 2/2012 | Dare et al. | |
| 2012/0185642 A1* | 7/2012 | Fletcher | G06F 12/0868 711/E12.001 |
| 2013/0036237 A1 | 2/2013 | Mutisya et al. | |
| 2013/0297346 A1 | 11/2013 | Kulkarni | |
| 2013/0325545 A1 | 12/2013 | Mordvinova et al. | |
| 2014/0007048 A1* | 1/2014 | Qureshi | H04L 9/0891 717/110 |
| 2014/0189680 A1* | 7/2014 | Kripalani | G06F 8/65 717/176 |
| 2015/0324606 A1 | 11/2015 | Grondin et al. | |
| 2016/0148115 A1 | 5/2016 | Sirosh et al. | |
| 2016/0248800 A1 | 8/2016 | Ng et al. | |
| 2017/0012897 A1 | 1/2017 | Eda et al. | |
| 2017/0124487 A1 | 5/2017 | Szeto et al. | |
| 2017/0212829 A1 | 7/2017 | Bales et al. | |
| 2017/0270441 A1 | 9/2017 | Dheer et al. | |
| 2018/0302303 A1* | 10/2018 | Skovron | G06F 11/34 |
| 2018/0375892 A1* | 12/2018 | Ganor | G06Q 10/0635 |
| 2019/0095230 A1 | 3/2019 | Glessner et al. | |
| 2019/0163928 A1 | 5/2019 | Hankeln et al. | |
| 2019/0213503 A1* | 7/2019 | Navratil | G06F 9/541 |
| 2019/0289001 A1 | 9/2019 | Milgramm | |
| 2019/0392351 A1* | 12/2019 | Zuluaga | G06N 20/20 |
| 2020/0007584 A1 | 1/2020 | Dixit et al. | |
| 2020/0012500 A1* | 1/2020 | Kern | G06F 9/445 |
| 2020/0012962 A1 | 1/2020 | Dent et al. | |
| 2020/0019393 A1* | 1/2020 | Vichare | G06N 20/00 |
| 2020/0151619 A1* | 5/2020 | Mopur | H04L 67/12 |
| 2020/0225964 A1* | 7/2020 | Soman | H04L 63/105 |
| 2020/0234188 A1* | 7/2020 | Maffei Vallim | H04L 67/10 |
| 2020/0379744 A1* | 12/2020 | Bhupati | H04L 67/61 |
| 2020/0403855 A1* | 12/2020 | Sarood | H04L 41/0894 |
| 2020/0403994 A1 | 12/2020 | Bitterfeld et al. | |
| 2021/0117859 A1* | 4/2021 | Rogers | H04L 41/082 |
| 2021/0264321 A1* | 8/2021 | Xiang | G06N 20/20 |

* cited by examiner

Enterprise Computer System *100*

Enterprise Computer System 100

<u>600</u>

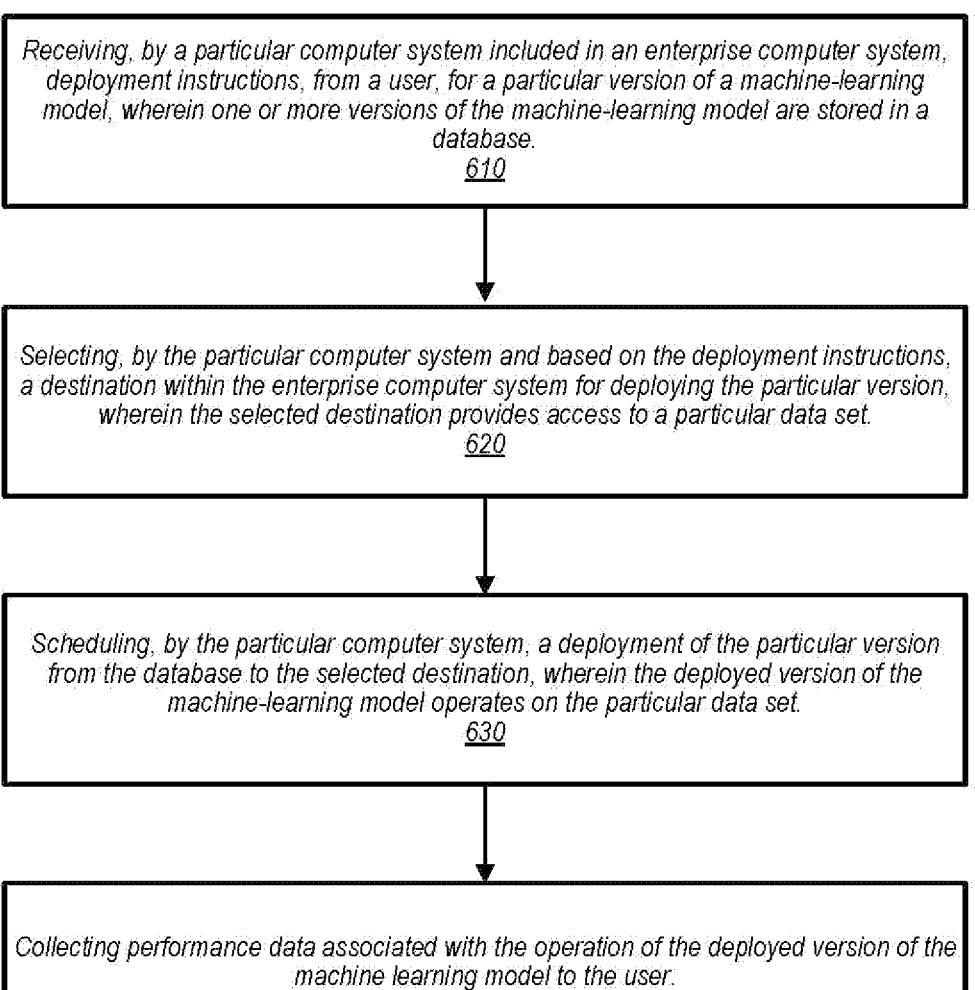

Receiving, by a particular computer system included in an enterprise computer system, deployment instructions, from a user, for a particular version of a machine-learning model, wherein one or more versions of the machine-learning model are stored in a database.
<u>610</u>

Selecting, by the particular computer system and based on the deployment instructions, a destination within the enterprise computer system for deploying the particular version, wherein the selected destination provides access to a particular data set.
<u>620</u>

Scheduling, by the particular computer system, a deployment of the particular version from the database to the selected destination, wherein the deployed version of the machine-learning model operates on the particular data set.
<u>630</u>

Collecting performance data associated with the operation of the deployed version of the machine learning model to the user.
<u>640</u>

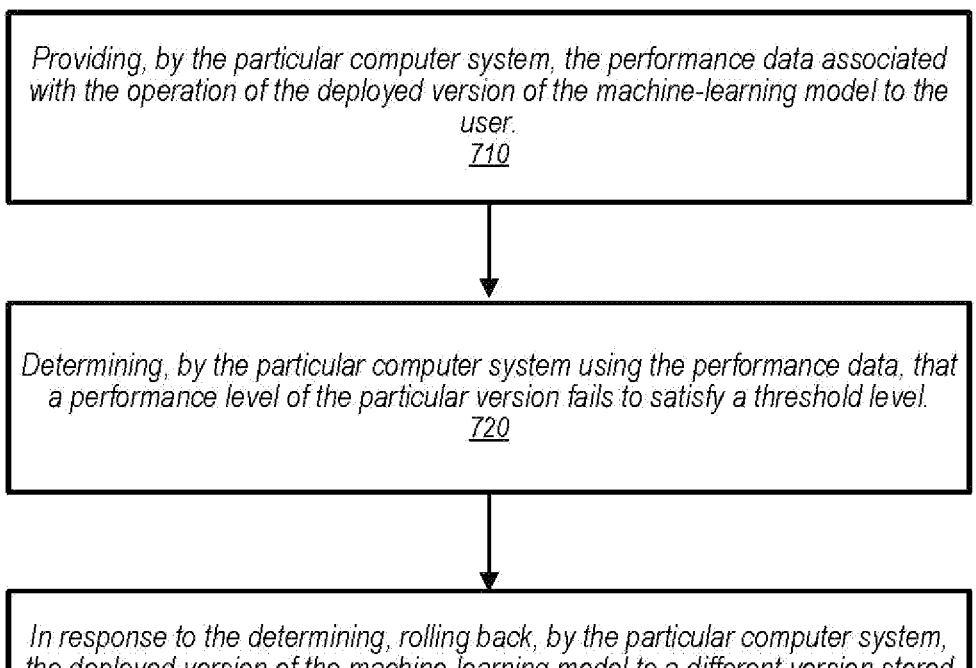

*Providing, by the particular computer system, the performance data associated with the operation of the deployed version of the machine-learning model to the user.*
710

*Determining, by the particular computer system using the performance data, that a performance level of the particular version fails to satisfy a threshold level.*
720

*In response to the determining, rolling back, by the particular computer system, the deployed version of the machine-learning model to a different version stored in the database.*
730

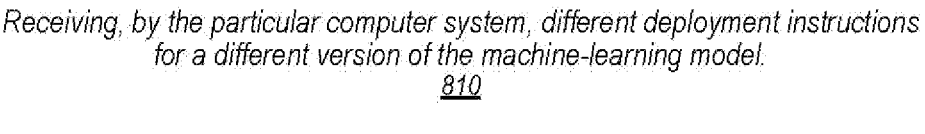

Receiving, by the particular computer system, different deployment instructions for a different version of the machine-learning model.
_810_

Selecting, by the particular computer system and based on the different deployment instructions, a different destination within the enterprise computer system for deploying the different version, wherein the different destination provides access to a different data set.
_820_

Scheduling, by the particular computer system, a deployment of the different version to the different destination, wherein the different version of the machine-learning model operates on the different data set concurrent to the particular version operating on the particular data set.
_830_

*FIG. 8*

COMPUTER MODEL MANAGEMENT SYSTEM

CROSS REFERENCE TO RELATED APPLICATION

The present invention is a Continuation of U.S. patent application Ser. No. 16/917,419, filed Jun. 30, 2020 and the disclosure of which is incorporated herein by reference in its entirety.

BACKGROUND

Technical Field

This disclosure relates generally to computer system operation, and more particularly to deployment of machine-learning models within a computer system.

Description of the Related Art

A business, government agency, school system, or any other form of large, multi-user entity may rely on an enterprise computing system to provide a computing infrastructure for a plurality of users. An enterprise computing system typically includes one or more server computers to provide computing power and one or more databases to provide network accessible information storage for these users. Such databases may have a variety of data management rules based on a type of information that is stored in each database. For a particular database, these data management rules may include, for example, identifying types of data that are permitted to be stored in the particular database, and/or determining whether to compress large data files.

Machine-learning models may be applied to data stored in such databases in order to determine compliance to the data management rules. Due to various security concerns, this data may not be located in a central repository, instead being distributed among multiple, isolated zones based on the sensitivity of the data. Development of these machine-learning models may include performing a training session for the models and verifying proper functionality. Testing and training of the models may be manually assigned to particular ones of the isolated zones.

BRIEF DESCRIPTION OF THE DRAWINGS

FIG. 6 depicts a flow diagram of an embodiment of a method for deploying a particular version of a machine-learning model to a particular destination within an enterprise computer system.

FIG. 7 shows a flow diagram of an embodiment of a method for managing performance data from a deployment of a particular version of a machine-learning model.

FIG. 8 shows a flow diagram of an embodiment of a method for deploying a different version of a machine-learning model to a different destination while a particular version is still deployed.

DETAILED DESCRIPTION

Figure 1:
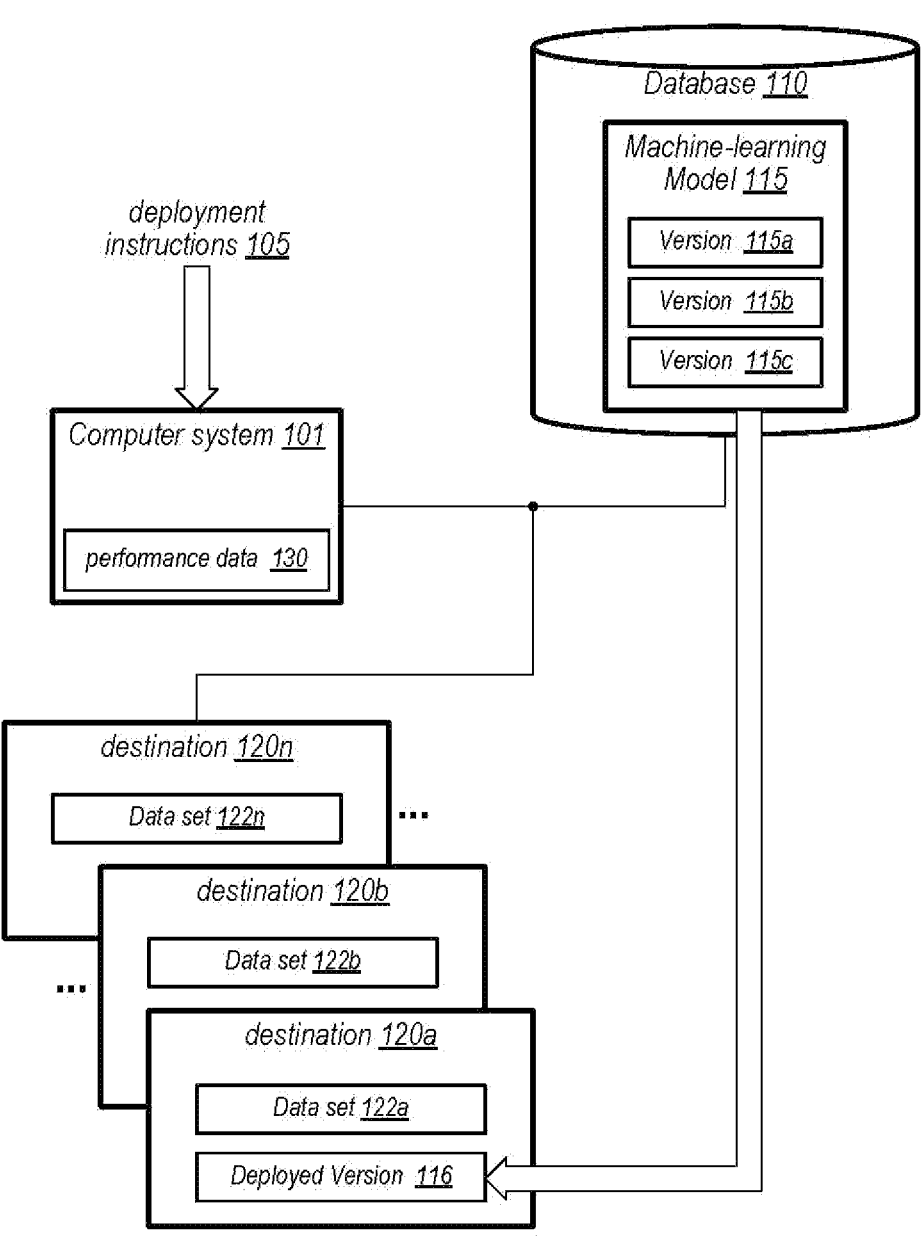
FIG. 1 illustrates a block diagram of an embodiment of an enterprise computer system.

Machine-learning models may be used to perform data management tasks on data stored in one or more databases within an enterprise computer system. For example, such machine-learning models may analyze stored data to determine whether the data is being stored in accordance with storage rules for a given security zone that protects a particular data set. Manually deploying a new model to a plurality of security zones may be a tedious process, requiring one or more system administrators to setup execution of the model within each zone of the plurality. As used herein, "to deploy" or "deploying" a model refers to releasing files for a particular version of a model such that the particular version may be performed by one or more processors in one or more computer systems. The setup procedure may include, for example, deploying the model to a production computer system in each security zone of the plurality, ensure associated data is loaded into the model in each security zone, schedule execution of each model within each zone, and other similar tasks. In addition, no rollback mechanism may exist to revert a new version of a machine-learning model to an alternate version should issues arise during the operation of the new version, such as failure to attain a threshold level of performance. The present inventors have identified a benefit to having an automated system that streamlines a lifecycle for releasing a model, from a development phase to a deployment phase.

Techniques are disclosed herein for deploying a machine-learning model to one or more destinations in an enterprise computer system, including, for example, deployment to one or more security zones. A "zone" refers to a collection of one or more data repositories (e.g., databases or other memory) that have some common characteristic (e.g., they are controlled by a particular network device, located in a common location, operate according to a set of policy rules, etc.). A "security zone" is a zone that is managed according to a set of data management rules to protect one or more data sets generated and/or stored within a given security zone. A system administrator or other authorized entity establishes a set of rules for a particular zone based, for example, on a type of information that is or will be stored in the data repositories that are included in the particular security zone. Multiple different security zones may exist within a computer network, with the potential that each zone might have a different set of data management rules.

In an embodiment of the disclosed techniques, a method is contemplated that includes deploying a machine-learning model to a destination in an enterprise computer system. A particular computer system included in an enterprise computer system receives deployment instructions, from a user, for a particular version of a machine-learning model. Based on the deployment instructions, the particular computer system selects a destination within the enterprise computer system for deploying the particular version. In some embodiments, the selected destination corresponds to a security zone that protects a particular data set. The particular computer system schedules a deployment of the particular version to the selected destination. Performance data associated with the operation of the deployed version of the machine learning model is collected to provide feedback.

A block diagram of an embodiment of an enterprise computing system is illustrated in FIG. 1. As shown, enterprise computing system 100 includes computer system 101, database 110, and a plurality of destinations 120a-120n (collectively referred to as destinations 120). A plurality of versions (115a-115c) of machine-learning model 115 are stored in database 110.

Enterprise computing system 100 may be any suitable computing system utilized by an entity (business, government, education system, and the like) to provide computing services to multiple users. In various embodiments, enterprise computing system may be implemented on one or more computing devices that are located in a same room, may be implemented on hundreds or thousands of computing devices located across the world, or may be implemented on any suitable scale between these examples. Database 110 is maintained in one or more storage devices, such as magnetic hard drives, solid-state drives, removable storage devices (e.g., CD-ROM, DVD-ROM, etc.), and the like.

Destinations 120, as shown, include one or more computer systems included enterprise computer system 100. In some embodiments, destinations 120 are respective security zones, each protecting one or more data sets. For example, destination 120a may include a security zone that stores and protects personal information of a group of users authorized to utilize services provided by enterprise computer system 100. Such personal information may include usernames and passwords (also referred to herein as "user credentials") used to access enterprise computer system 100. Destination 120b may include, e.g., data and programs associated with the services provided by enterprise computer system 100. Destination 120n may, for example, include data associated with users' usage of the services, such as documents created using online applications and/or various user settings, preferences, history, and the like. One or more of destinations 120, in some embodiments, may include computer system 101.

As illustrated, computer system 101 is coupled to database 110 and to destinations 120. The coupling may be implemented by physical cables used in a local area network (LAN), by internet connections that include Ethernet and WiFi connectivity, or by a combination thereof. Computer system 101 may be any suitable type of computer system, including a desktop computer, a laptop computer, a server computer, a mobile device, and the like.

Computer system 101, as shown, receives deployment instructions 105 from a user. Deployment instructions 105 include one or more directives for deploying a particular version (e.g., version 115c) of machine-learning model 115 to one of destinations 120 in enterprise computer system 100. Deployment instructions 105 may include one or more directives, such as an indication of one or more of destinations 120 for deployment of machine-learning model 115, a start time for beginning execution, a stop time for ending execution, an indication of types of data to be processed during the deployment, an indication of an amount of data to be processed, threshold values for one or more performance parameters to be monitored, rollback instructions if a threshold value is not satisfied, or any other suitable instruction for deployment.

As illustrated, computer system 101 selects, based on deployment instructions 105, one of destinations 120 (e.g., destination 120a) within enterprise computer system 100 for deploying version 115c. Destination 120a provides access to data set 122a. In various embodiments, data set 122a may be stored in, or accessed via, destination 120a. Deployment instructions 105 may, in some embodiments, specify destination 120a directly. In other embodiments, deployment instructions 105 may specify a particular type of data, and computer system 101 determines that the particular type of data is included in data set 122a, and thereby selects destination 120a.

Computer system 101 schedules a deployment of version 115c from database 110 to selected destination 120a. This scheduling may include determining a date and/or time of day for version 115c to begin operation, or may include scheduling version 115c to begin at a next available window. In some embodiments, the scheduling may result in version 115c being deployed and beginning operation immediately. Computer system 101 may, in some embodiments, instruct a processor included in database 110 to send files associated with version 115c to destination 120a. In other embodiments, computer system 101 may copy the associated files from database 110 and store them at destination 120a. Alternatively, computer system 101 may instruct a processor included in destination 120a to retrieve the files associated with version 115c. Version 115c is deployed to destination 120a as deployed version 116. Deployed version 116 of machine-learning model 115 operates on data set 122a. Operation of deployed version 116 on data set 122a includes performance of any suitable tasks, such as detecting if data items included in data set 122a are being stored in accordance with relevant data management rules, or if data items included in data set 122a have an indicated age or file size that makes the data item a candidate for data compression.

Performance data 130 associated with the operation of deployed version 116 of machine-learning model 115 is collected. Performance data 130 may include data indicative of one or more performance metrics applicable to the operation of deployed version 116. For example, performance data 130 may include indications of an accuracy of deployed version 116. Accuracy may be determined using results produced by deployed version 116 to results produced by a different version of machine-learning model 115 or by a different source such as a different model or by a system administrator. Performance data 130 may include values indicative of an elapsed time for deployed version 116 to complete operations on all or a portion of data set 122a. This elapsed time may be compared to similar values determined for other versions of machine-learning model 115 or a different model. As shown, computer system 101 collects performance data 130. In other embodiments, however, destination 120a, or a different computer system that is not shown, may collect performance data 130.

Collected performance data 130 may be provided to the user and/or to others, such as a model developer, a system administrator, a manager, and the like. In some embodiments, performance data 130 is provided as a summary of the data and/or graphical representations of the data. In other embodiments, all collected performance data 130 is presented, such as in a tabular or list format. In further embodiments, collected performance data 130 is used to make a determination, by computer system 101, that a performance level of deployed version 116 fails to satisfy a threshold level. In response to the determination, an alert may be generated for the user and/or system administrator to inform them of the unsatisfactory performance. In other embodiments, in response to the determining, computer system 101 rolls back deployed version 116 of machine-learning model 115 to a different version (e.g., version 115a or 115b) stored in database 110.

Using techniques for deploying a machine-learning model such as described above may streamline a model deployment process that includes deployment of a machine-learning model to one or more separate destinations, monitoring of the model's performance in each destination, and providing timely and accurate feedback to developers and system administrators regarding the performance of the model. The disclosed techniques may reduce an amount of time for training and effectively deploying machine-learning models such that the models are integrated into an operational enterprise computer system with little to no impact to the on-going operation of the enterprise computer system. In addition, the disclosed techniques may provide mitigation for poor performance of a new version of a model by providing a means to roll the new version back to an alternate version that may avoid or address the performance issue.

It is noted that the embodiment of FIG. 1 is merely an example for demonstration of disclosed concepts. In other embodiments, the illustrated enterprise computing system may include a different combination of elements, including additional elements. For example, additional databases may be utilized for storing machine-learning models. In some embodiments, computer system 101 may include a plurality of computer systems for developing, deploying, and monitoring machine-learning models.

The enterprise computing system of FIG. 1 illustrates how a computer system may deploy a version of a model stored in a database to one of multiple destinations. Another embodiment of the enterprise computer system, one that includes security zones and a feedback database, is illustrated in FIG. 2.

Figure 2:
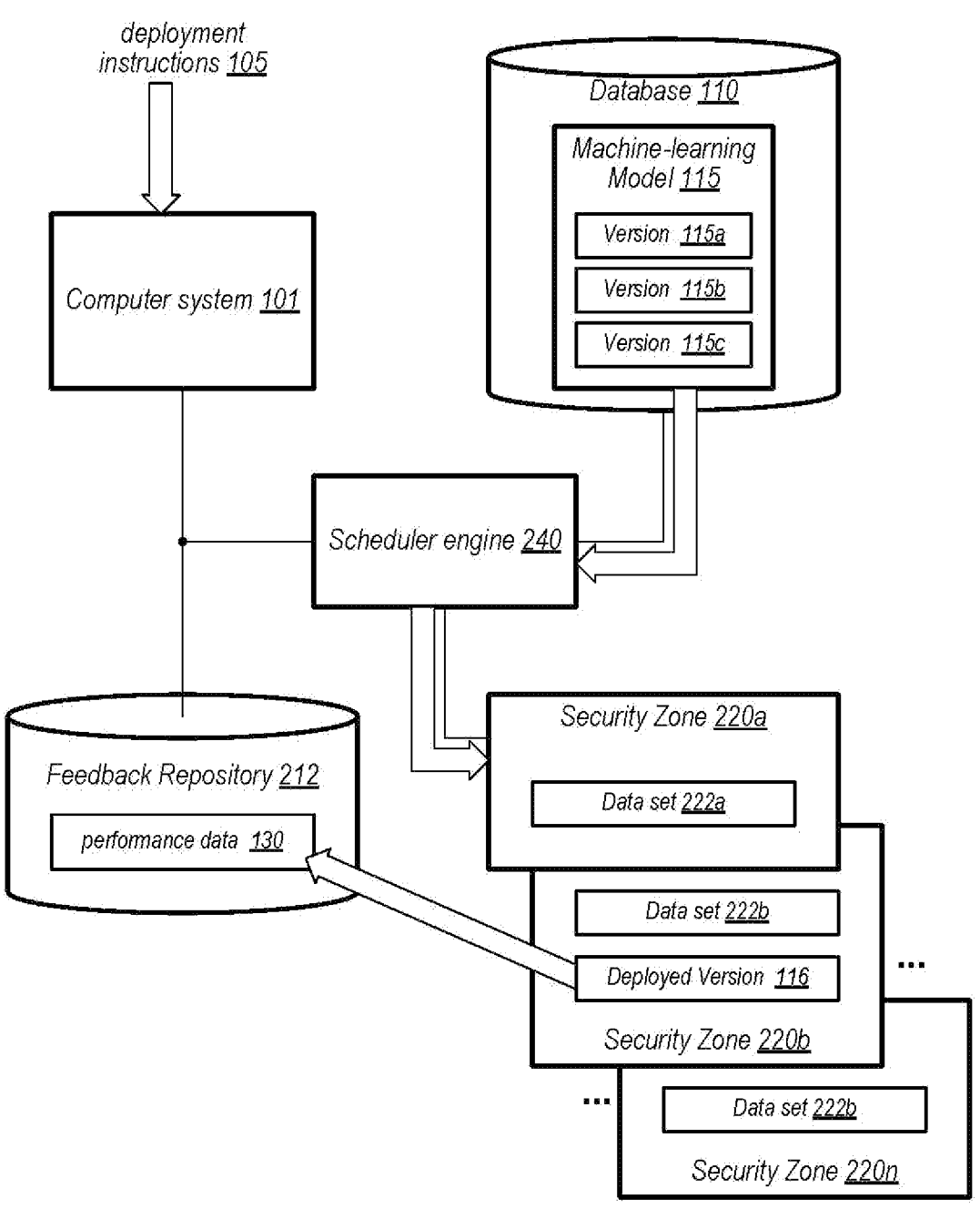
FIG. 2 shows a block diagram of an embodiment of an enterprise computer system that includes a plurality of security zones.

Moving to FIG. 2, a block diagram of another embodiment of enterprise computer system 100 is shown. The embodiment of FIG. 2 includes computer system 101 and database 110 from FIG. 1. Additionally, in FIG. 2, enterprise computer system 100 includes feedback repository 212, security zones 220a-220n (collectively 220), and scheduler engine 240. In a similar manner as described above, computer system 101 receives deployment instructions 105 and then utilizes scheduler engine 240 to deploy a particular version of machine-learning model 115 to one of security zones 220.

After receiving deployment instructions 105, computer system 101 uses deployment instructions 105 to identify a particular one of versions 115a-115c of machine-learning model 115 that will be deployed. Computer system 101 further uses deployment instructions 105 to select one of security zones 220 for deploying the particular version. Security zones 220, as shown, each protect a respective one of data sets 222a-222n. As described above, each security zone 220 may protect a particular type of data, or may protect data for a particular organization, region, or other suitable data classification.

As illustrated, computer system 101 schedules a deployment of the particular version of machine-learning model (e.g., version 115a) from database 110 to the selected security zone (e.g., security zone 220b). Version 115a becomes deployed version 116 after deployment and operates on data set 222b in security zone 220b. In some embodiments, scheduling the deployment of version 115a includes sending, by computer system 101, commands to scheduler engine 240, wherein the commands cause scheduler engine 240 to copy version 115a of machine-learning model 115 from database 110 to security zone 220b. Scheduler engine 240 is a process that may run in any suitable location within enterprise computer system 100. For example, scheduler engine 240 may run on computer system 101, on a computer system associated with security zone 220b, a computer system associated with database 110 or feedback repository 212, or on a computer system that is separate from the illustrated elements of enterprise computer system 100. The commands received from computer system 101 based on deployment instructions 105 may include an indication of a location of, and/or file names for, version 115a of machine-learning model 115. Scheduler engine 240 locates and copies the appropriate files from database 110 and stores the copies in security zone 220b.

The scheduling may further include establishing, based on deployment instructions 105, a particular start and/or stop time for operating deployed version 116. Deployment instructions 105 may include a date, a day of the week, a time of day, or a combination thereof, for starting and/or stopping the deployment. For example, deployment instructions 105 may indicate that the deployment should begin at 10:00 AM on June 1 and end on June 15 at 11:59 PM. The start time may be omitted, indicating that the deployment should start at a next available opportunity (e.g., after version 115a is copied into security zone 220b, or during a next deployment window, if supported). Likewise, the stop time may be omitted and the deployment continues until either stopped by subsequently-received different deployment instructions or in response to determining that deployed version 116 fails to satisfy a performance threshold.

Computer system 101, as shown, collects performance data 130 associated with operation of deployed version 116 of machine-learning model 115. During operation of deployed version 116, performance data 130 is collected and stored in feedback repository 212. Feedback repository 212 may be any suitable memory, such as a non-volatile data storage device, e.g., a hard-disk drive (HDD) or a solid-state drive (SSD) or volatile memory such as dynamic or static random-access memory (DRAM or SRAM, respectively). In various embodiments, feedback repository 212 may be located in database 110, computer system 101, scheduler engine 240, security zone 220b, a different system not shown, or as a system dedicated for use as feedback repository 212.

The type of information collected as performance data 130 may vary depending on an intended function of machine-learning model 115. For example, deployed version 116 may be configured to scan data set 222b to identify any data items within data set 222b that include personal information. In such an example, performance data 130 may include: a number of data items scanned during the deployment; an amount of execution time or processor cycles used to scan one or more data items; a number of data items that are tagged by deployed version 116 as including personal information; a number of data items that are actually considered to include personal information (as determined, e.g., by a previous version of machine-learning model 115, by a system administrator, by a different model, or combination thereof); and other similar information. Performance data 130 may be used to determine an accuracy, an execution speed, an execution efficiency, and the like, for deployed version 116.

As illustrated, computer system 101 retrieves performance data 130 from feedback repository 212. During the scheduled deployment, computer system 101 may poll or otherwise contact feedback repository to determine if performance data 130, in whole or in part, has been collected. After determining that performance data 130 is available, computer system 101 may retrieve at least a portion of the collected data and send a notification of the retrieving to the user indicating that performance data 130 is available for review. In other embodiments, computer system 101 may send a notification to the user that performance data 130 is available for review, and then retrieve some or all of performance data 130 in response to commands from the user. Computer system 101 may provide performance data 130 to the user in any suitable fashion, such as graphs, tables, and the like.

Using performance data 130, computer system 101, as shown, determines that a performance level of deployed version 116 fails to satisfy a threshold level. The threshold level, may correspond to any suitable metric of performance, such as accuracy, efficiency, speed of execution and the like. In some embodiments, multiple threshold levels may be used to assess performance against respective metrics. In other embodiments, various metrics associated with the collected performance data 130 may be combined into a single performance score and compared to a single threshold level. In response to determining that the performance level fails to satisfy the threshold level, computer system 101 may roll back deployed version 116 of machine-learning model 115 to a different version stored in database 110 (e.g., version 115*b*). In some embodiments, rolling back deployed version 116 includes, selecting, by computer system 101, the different version of machine-learning model 115 based on deployment instructions 105. For example, deployment instructions 105 may identify a particular one of versions 115*b* and 115*c* to use to replace version 115*a* as the deployed version. In some cases, deployment instructions 105 may indicate that a most recently released version should be used for the roll back, or that computer system 101 should determine the particular version based on which version is deployed to a different one of security zones 220.

It is noted that FIG. 2 is merely one example. Different combinations of elements may be utilized in other embodiments. For example, database 110 is shown with three versions of a single machine-learning model. In other embodiments, additional models may be included in the database as well as a different number of versions for each model. Additional feedback repositories may be included in some embodiments, for example, one repository may be included for each security zone.

The enterprise computing systems of FIGS. 1 and 2 illustrate various techniques for deploying a version of a machine-learning model. These enterprise computer systems are described as including a computer system that receives instructions for deploying a particular version to a particular destination. Such computer systems may be implemented in a variety of manners. Details of one such embodiment are illustrated in FIG. 3.

Figure 3:
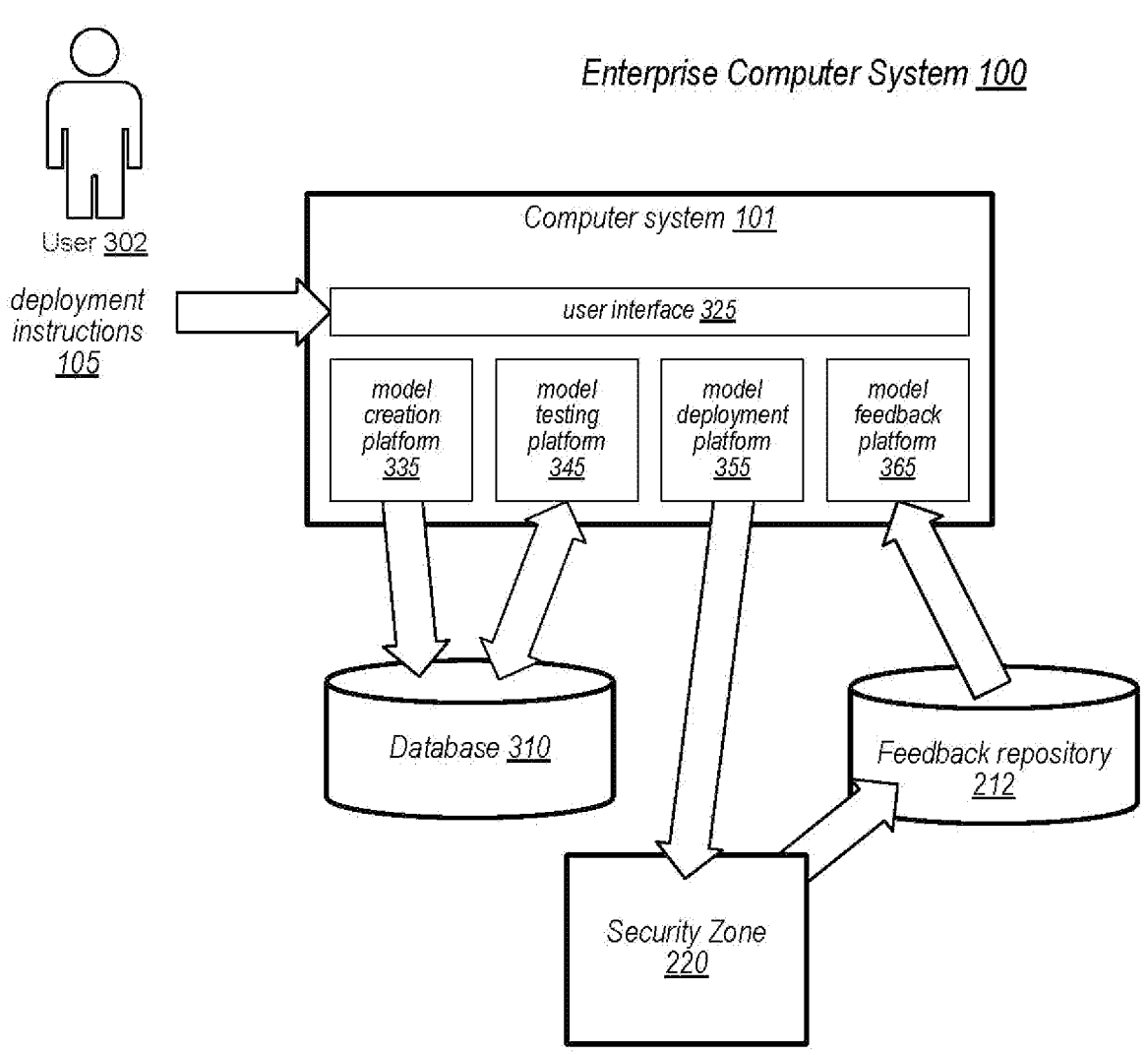
FIG. 3 depicts a block diagram of an embodiment of a computer system that deploys machine-learning models within an enterprise computer system.

Turning to FIG. 3, a block diagram of another embodiment of enterprise computer system 100 is shown. The enterprise computing system 100 of FIG. 3 includes elements previously described in regards to FIG. 2, including security zone 220 and feedback repository 212. Enterprise computing system 100 further includes database 310. In various embodiments, database 310 may or may not correspond to database 110 in FIGS. 1 and 2. Computer system 101 is depicted with additional details regarding processes that may be utilized to perform the tasks described above. Computer system 101 is shown with five processes that may be used for a model development method: user interface

325, model creation platform 335, model testing platform 345, model deployment platform 355, and model feedback platform 365.

User 302 uses computer system 101 to create, test, deploy, and monitor a model, such as machine-learning model 115 in FIGS. 1 and 2. As illustrated, user 302 interacts with user interface 325 to perform the various actions described herein. Accordingly, user interface 325 includes a combination of hardware (e.g., keyboards, mice, displays) and software (e.g., drivers for the hardware, text editing programs, and the like). In some embodiments, user interface 325 may include support for interfacing with user 302 via a web browser, allowing user 302 to utilize a different computer system than computer system 101.

Via user interface 325, user 302 develops a model using model creation platform 335. As shown, model creation platform 335 includes processes for writing, building, and compiling the model. The model may include a variety of files that include commands in one or more programming languages, as well as data files for use with the model. These various files are stored on database 310. During the model development, user 302 may save a plurality of versions of the model. The versions may be designed to support different features for different destinations, to evaluate different techniques for accomplishing a same task, or for any other suitable reason. Database 310 and computer system 101 may, therefore support a versioning technique to link particular files to one or more related versions of the model.

As illustrated, model testing platform 345 includes one or more processes for testing execution of the model. Model testing platform may include debug tools as well as a simulation process for providing an environment for executing the model without the model being released to a production computer system. This may allow user 302 to test functionality of the model without risk of disrupting a production environment. Model testing platform 345 retrieves, from database 310, model files associated with a particular version of the model and provides test data and/or other stimulus for exercising features of the model. Model testing platform 345, however, may not provide as large a data sample for evaluating performance as is found in the production environment.

To perform a more thorough evaluation of the performance of the model, user 302 utilizes model deployment platform 355. Model deployment platform 355 includes one or more processes for performing at least some of the actions described above. For example, model deployment platform 355 receives, via user interface 325, deployment instructions 105 from user 302, for a particular version of a plurality of versions of a machine-learning model. Based on deployment instructions 105, model deployment platform 355 determines that security zone 220 is to be used for deploying the particular version. After determining a destination for the particular version, model deployment platform schedules a deployment of the particular version to security zone 220. In some embodiments, model deployment platform 355 copies files associated with the particular version of the model from database 310 to a different database that is accessible to security zone 220. Model deployment platform 355 may instead or additionally copy the associated files to security zone 220.

During the deployment, data indicative of the performance of the particular version of the model is collected in feedback repository 212. Model feedback platform 365 includes one or more process for providing the performance data associated with the operation of the deployed version of the model to user 302. For example, model feedback platform 365 may retrieve, in response to an indication, for example, the performance data from feedback repository 212, and then send a notification of the retrieving to user 302 indicating that the performance data is available for review. In other embodiments, model feedback platform 365 may periodically retrieve any available performance data from feedback repository 212 and notify user 302 when new performance data is available. In other embodiments, deployment instructions 105 includes a particular set of performance metrics to monitor, and model feedback platform 365 sends the notification to user 302 when new performance data related to the monitored metrics is available.

In some embodiments, model feedback platform 365 may provide some analysis of the performance data stored in feedback repository. For example, a particular portion or feature of the particular version of the model may be highlighted as a common source of performance bottlenecks and/or reduced accuracy of results. Taken further, in some embodiments, model feedback platform 365 may be capable of identifying problematic portions of a deployed model and provide suggestions for updates and/or alternate implementations to address the problematic portions. Model feedback platform 365 may further provide suggestions for optimizations, and in some embodiments, generate an updated version of the particular version of the model for future deployment and/or for use in case of a roll back of the deployed version.

As illustrated, deployment instructions 105 may include one or more performance threshold values to compare to relevant performance data that has been retrieved. Model feedback platform 365, in response to determining that the performance data fails to satisfy a threshold value, sends a different notification to user 302. This different notification may include a different type of alerts than the notification that the performance data is available for review. For example, model feedback platform 365 may send an email to user 302 when new performance data is available. If, however, a threshold value is not satisfied, then model feedback platform 365 may send a text message, or a push notification to a mobile device associated with user 302 to potentially reduce an amount of time for user 302 to receive the notification.

In response to determining that the performance data fails to satisfy the threshold value, model feedback platform 365 may further send an alert to model deployment platform 355 indicating the determination. In response to the alert, model deployment platform 355, based on deployment instructions 105, may roll back the particular version of the model to a previously released version or to a different version, as previously described in regards to FIGS. 1 and 2. For example, a different version of the model may include updates related to feedback captured from model feedback platform 365 during the deployment of the particular version of the model. Depending on a length of time of the deployment, user 302 may have an opportunity to revise the particular version of the model based on observed feedback before the deployment ends. Based on deployment instructions 105, this updated different version may be used for the roll back.

It is noted that the example of FIG. 3 is used to describe the disclosed techniques. Although computer system 101 is described as being used by the user to perform all tasks associated with the development lifecycle of a model, in other embodiments, the user may utilize one or more computer systems during the development. Accordingly, computer system 101 may include any computing device used by the user to perform the disclosed tasks. Furthermore, the partitioning of the described actions into the illustrated platforms is one example. In other embodiments, the described actions may be partitioned into different platforms. For example, the model deployment platform is described as performing the roll back of the particular version of the model. In other embodiments, the model feedback platform, or other platform, may perform the roll back.

Various techniques for deploying a version of a machine-learning model are illustrated in FIGS. 1 and 2. The described techniques include use of a computer system that receives instructions for deploying a particular version to a particular destination, such as a security zone. An example of a security zone used for deploying a particular version of a model is illustrated in FIG. 4.

Figure 4:
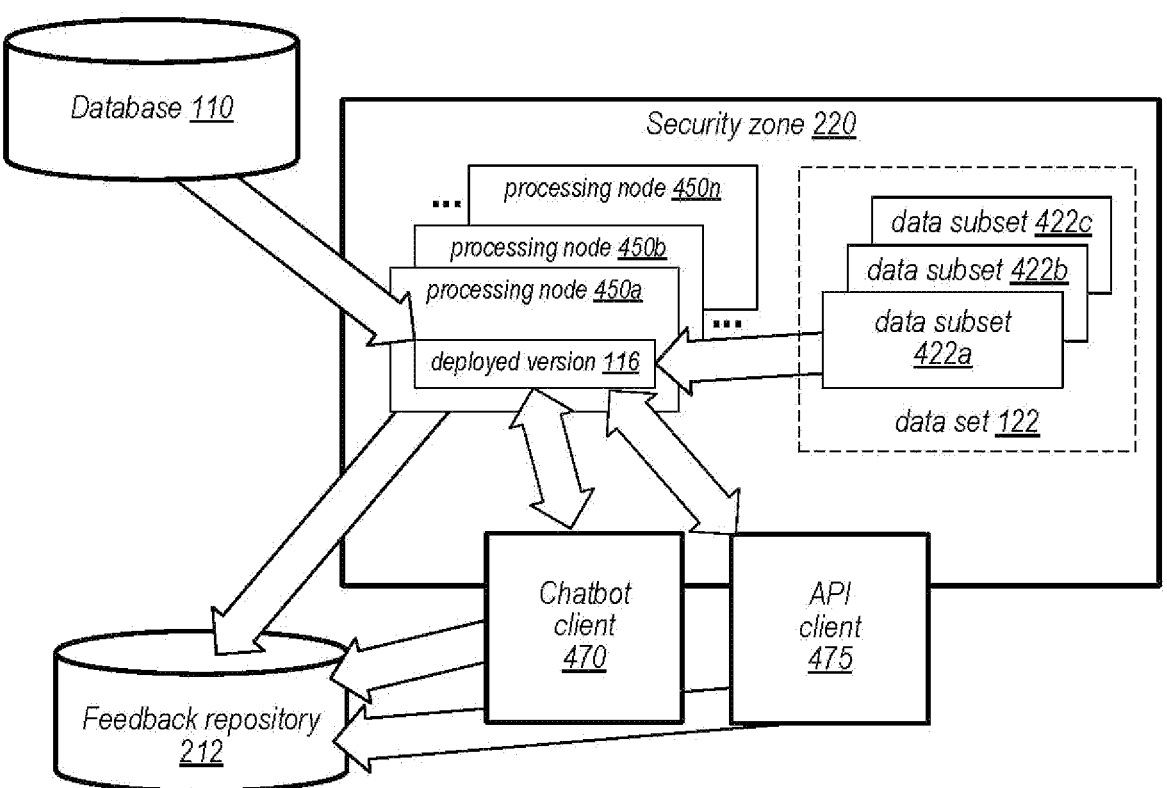
FIG. 4 illustrates a block diagram of an embodiment of a security zone, within an enterprise computer system, on which a machine-learning model is deployed.

Proceeding to FIG. 4, a block diagram of another embodiment of enterprise computer system 100 is shown. The embodiment of enterprise computing system 100 in FIG. 4 includes elements previously described in regards to FIGS. 1 and 2, including database 110, feedback repository 212, and security zone 220. Security zone 220 is depicted with additional elements used to perform tasks described above, such as processing nodes 450a-450n (collectively processing nodes 450) as well as data subsets 422a-422c. Enterprise computer system 100 also includes chatbot client 470 and API 475.

Using techniques as described above, a computer system, such as computer system 101 in FIGS. 1-3, deploys a version of a machine-learning model to security zone 220 based on deployment instructions, such as deployment instructions 105. The deployment may be temporary for evaluation or training purposes or may be deployed for production use. While deployed, deployed version 116 of the machine-learning model operates on a data set protected within security zone 220. As illustrated, security zone 220 includes data set 122, which includes three portions, data subsets 422a, 422b, and 422c.

In addition to selecting security zone 220 within enterprise computer system 100 for operating deployed version 116, deployment instructions 105 may further include directives for limiting deployed version 116 of the machine-learning model to operate on a subset of data set 122, such as data subset 422a. In some embodiments, each subset of data set 122 may correspond to different type of data, such as text, images, executable files, and the like. In other embodiments, each of data subsets 422a-422c may correspond to any suitable type of data from a particular source. In some embodiments, deployment instructions 105 include directives for limiting deployed version 116 of the machine-learning model to operate on a particular percentage of data set 122. In such embodiments, each of data subsets 422a-422c may represent a respective percentage of data set 122.

As illustrated, deployment instructions 105 may also include directives for limiting deployed version 116 of the machine-learning model to operate on a particular one of processing nodes 450 included in security zone 220. Security zone 220 includes processing nodes 450 to perform various tasks. In some embodiments, deployment instructions 105 include an indication for operating deployed version 116 on a particular one or more these processing nodes 450. Limiting deployed version 116 to a particular processing node, e.g., processing node 450a, causes deployed version 116 to be executed only by processing node 450a. In some embodiments, this may allow other ones of processing nodes 450 to execute other versions of the machine-learning model. In such embodiments, deployed version 116 may operate only on one of data subsets 422a-422c, such as a particular one of data subsets 422a-422c that includes data items used by processing node 450a. In other embodiments, execution of deployed version 116 may be limited to processing node 450a, but may still operate on any data item in data set 122, regardless of which processing node 450 the data item is used.

Limiting operation of deployed version 116 of the machine-learning model to a particular one of data subsets 422a-422c and/or to a particular one of processing nodes 450 may be done for a variety of reasons. The limiting may reduce a number of data items deployed version 116 operates on, resulting in a desired amount of feedback that can be used to evaluate deployed version 116. The limiting may also be done to avoid certain types of data items. For example, the machine-learning model may only be applicable to text-type data items, so other types of data items are avoided. Bandwidth limitations among processing nodes 450 may result in deployed version 116 being deployed to one or more of processing nodes 450 that have enough spare bandwidth to execute deployed version 116 without negative impact to a performance of other processes.

In some embodiments, deployed version 116 may operate on data items that are not included in security zone 220 at the time the deployment is initiated. As illustrated, at least some data items of data set 122 are generated after deployed version 116 of the machine-learning model is deployed. For example, some data items of data set 122 may be generated by chatbot client 470, while other data items of data set 122 are accessed via application programming interface (API) 475 to an application executing elsewhere in enterprise computer system 100. Chatbot client 470 is a software process used to emulate interaction with a human. Based on prompts generated by deployed version 116 or by other processes performed in security zone 220, chatbot client 470 generates responses that may be similar to how a human would respond. At least some of the responses generated by chatbot client 470 may be added to data set 122 and subsequently operated on by deployed version 116. API 475 includes functions for calling another application within enterprise computer system 100. Such applications may, in some embodiments, be performed external to security zone 220. Performance of the applications cause additional data items to be generated that may be added to data set 122 and subsequently operated on by deployed version 116. Performance data may be collected while deployed version 116 operates on data items generated by chatbot client 470 and/or API 475 and stored in feedback repository 212. Use of data items generated by API 475 and by chatbot client 470 may provide a more realistic data set during the deployment, as compared to operating on a data set that is generated by a developer. This increased realism may increase an accuracy of the collected performance data and, therefore, provide a more thorough evaluation or training for deployed version 116.

It is noted that FIG. 4 is merely an example of a security zone and related elements. In other embodiments, security zone may include other elements such as one or more storage devices for storing data set 122 and/or one or more network interfaces for communicating via API 475 and chatbot client 470.

FIGS. 1-4 and the accompanying descriptions illustrate deployment of one version of a machine-learning model to a particular destination. An embodiment of an enterprise computer system is shown in FIG. 5 in which two versions of a machine-learning model are deployed concurrently.

Figure 5:
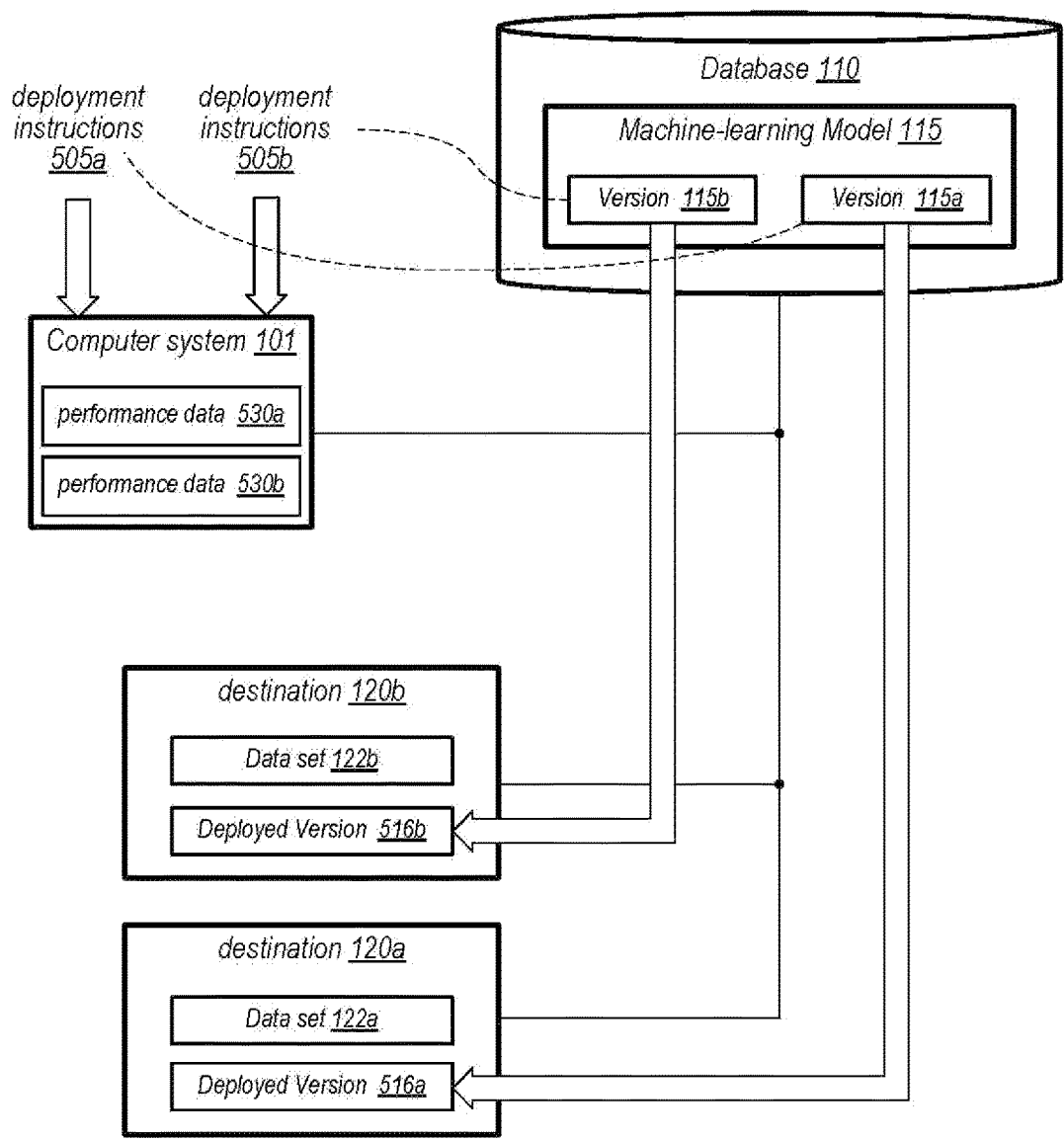
FIG. 5 shows a block diagram of an embodiment of an enterprise computer system capable of deploying two or more versions of a machine-learning model concurrently.

Moving now to FIG. 5, an embodiment of an enterprise computer system in which two versions of a machine-learning model are deployed is illustrated. Enterprise computer system 100 includes elements shown in FIG. 1, such as computer system 101, database 110, and destinations 120a and 120b. As depicted, computer system 101 receives two sets of deployment instructions, 505a and 505b.

In various embodiments, computer system 101 may receive deployment instructions 505a and 505b in any order. As shown, computer system 101 first receives deployment instructions 505a, which indicate that version 115a of machine-learning model 115 is to be deployed to destination 120a. In response, computer system 101 selects destination 120a and schedules a deployment of version 115a to be performed as deployed version 516a. During deployment, deployed version 516a operates on data set 122a.

During the deployment of deployed version 516a, computer system 101 receives deployment instructions 505b, different from deployment instructions 505a. Deployment instructions 505b indicate that version 115b (different from version 115a) of machine-learning model 115 is to be deployed to destination 120b. Computer system 101, in turn, selects destination 120b and schedules a deployment of version 115b to be performed as deployed version 516b, operating on data set 122b.

As deployed versions 516a and 516b concurrently operate on data sets 122a and 122b, respectively, performance data 530a and 530b are made available to computer system 101. Deployment instructions 505a and/or 505b may include one or more threshold values for determining if the corresponding deployed version 516a and/or 516b are operating to acceptable levels. If, for example, deployed version 516a fails to satisfy a threshold value, then computer system 101 (or in some embodiments, destination 120a) determines that deployed version 516a is to be rolled back to a different version. In the present example, deployment instructions 505a indicate that deployed version 516a is to be rolled back to deployed version 516b if deployed version 516b currently satisfies any threshold values in deployment instructions 505b.

It is noted that, in this example, version 115a is rolled back to version 115b that is a different version of machine-learning model 115 that is deployed after version 115a. Roll back instructions, therefore, do not necessarily need to call for a roll back to an older version of the model. A developer may create several versions of a machine-learning model, and deploy them at a same or subsequent points in time. Roll back instructions included in the deployment instructions may indicate that, in the event of a deployed version failing to satisfy included threshold values, the deployed version is rolled back to a different one of the several versions. For example, if four versions of a model are deployed concurrently, roll back instructions for each of the four versions may indicate that performance data for each version is used to select a different version for a roll back. If the first version fails to meet the threshold value, then the third version may be selected based on, e.g., having a highest value for one or more metrics included in the performance data, as compared to the second and fourth versions.

Such management of the deployment of multiple versions of a machine-learning model may allow a developer to experiment with, and receive feedback for, various implementations in parallel, thereby reducing a time to release a new version of the machine-learning model into production. Instead of releasing a single version, waiting for results, and then releasing a second version, the multiple versions may be deployed and feedback may be received, concurrently. A deployed version that does not meet performance thresholds can be rolled back to a different deployed version that is also under evaluation, potentially reducing an amount of time to collect relevant performance data on that different version.

It is noted that the embodiment of FIG. 5 is merely an example. For clarity, only elements for demonstrating the disclosed concepts have been shown. In other embodiments, additional elements may be included, such as more destinations. In some embodiments, more than two sets of deployment instructions may be received concurrently.

FIGS. 1-5 illustrate block diagrams of systems for deploying one or more versions of a machine-learning model. Such systems may perform the disclosed tasks using a variety of methods. Three such methods are illustrated in FIGS. 6-8.

Turning now to FIG. 6, a flowchart of an embodiment of a method for deploying a version of a machine-learning model is illustrated. Method 600 may be performed by a computer system included in an enterprise computer system, such as computer system 101 in FIGS. 1-3. Computer system 101, for example, may access a non-transitory, computer-readable medium having program instructions stored thereon that are executable by computer system 101 to cause the operations described in regards to FIG. 6. Referring collectively to FIGS. 1 and 6, method 600 begins with block 610.

Method 600 includes, at block 610, receiving, by computer system 101 included in enterprise computer system 100, deployment instructions 105, from a user, for a particular version of machine-learning model 115, wherein versions 115a-115c of machine-learning model 115 are stored in database 110. A user prepares deployment instructions 105 for deploying a particular version, e.g., version 115c, in order to perform an evaluation, a training, a release to production, or other similar task related to the development and management of machine-learning model 115. The deployment instructions may be generated by the user, for example, by using a user interface provided by computer system 101 as shown in FIG. 3. Such a user interface may allow the user to create deployment instructions 105 from a different computer system than computer system 101. Deployment instructions 105 include one or more directives indicating how the deployment of version 115c is to be managed.

At block 620, method 600 also includes selecting, by computer system 101 and based on deployment instructions 105, destination 120a within enterprise computer system 100 for deploying version 115c, wherein destination 120a provides access to data set 122a. As shown, deployment instructions 105 include an indication of a destination for deploying version 115c. Destination 120a may, in some embodiments, be one of a plurality of security zones in enterprise computer system 100, such as one of security zones 220 in FIG. 2. Security zones 220 may be utilized to protect respective ones of data sets 222 based on one or more security rules for managing personal or other sensitive data.

Selecting destination 120a within enterprise computer system 100 includes, in some cases, limiting version 115c of machine-learning model 115 to operate on a subset of data set 122a. For example, data set 122a may include a variety of types of data items and deployment instructions 105 identify one or more particular types of data items on which version 115c is permitted to operate. In some cases, deployment instructions 105 may indicate a percentage of data items in data set 122a on which version 115c is permitted to operate. Directives included in deployment instructions 105 may also call for limiting version 115c of machine-learning model 115 to operate on a particular processing node of a plurality of processing nodes included in destination 120a. This may allow a developer to select a particular node that has available bandwidth for processing version 115c. In other cases, this may allow the developer to deploy different versions of machine-learning model 115 to different processing nodes in a same destination, thereby allowing for a performance comparison between the different versions as they operate on the same data set.

Method 600, at block 630, further includes scheduling, by computer system 101, a deployment of version 115c from database 110 to destination 120a, wherein deployed version 116 of machine-learning model 115 operates on data set 122a. The deployment may be scheduled to occur at a particular date and time, or after a particular amount of time has elapsed since the scheduling. In some embodiments, the deployment may be scheduled to occur at a next available time. The scheduling may include copying, by computer system 101, version 115a of machine-learning model 115 from a version management system to database 110. This may allow a processing node in destination 120a to access version 115a from database 110 and copy it into destination 120a, thereby creating deployed version 116.

In some embodiments, deployed version 116 may operate on data that is not generated or is otherwise not included in data set 122a when version 115c is initially deployed to destination 120a. For example, after version 115c of machine-learning model 115 is deployed, at least some of data set 122a may be generated by a chatbot client, such as chatbot client 470 in FIG. 4. Other data items of data set 122a may be accessed via an API to an application executing elsewhere in enterprise computer system 100 (e.g., API 475).

At block 640, method 600 includes collecting performance data 130 associated with operation of deployed version 116 of machine-learning model 115. Performance data 130 may include data corresponding to any performance metric that is applicable to the operation of deployed version 116. A processing node within destination 120a, computer system 101, and/or another computer system within enterprise computer system 100 may monitor the performance of deployed version 116 and store indications of the monitored performance in a repository, such as feedback repository 212 in FIGS. 2-4. Computer system 101 may poll feedback repository 212 to determine if new data has been added to performance data 130, and/or may receive a notification when new data is available for review. Collecting of performance data 130 may continue until an end of the deployment is reached, e.g., at a particular date and time of day, after a particular amount of time elapses since the deployment began, or in response to an occurrence of a particular event.

It is noted that method 600 is one example of a method for deploying a version of a machine-learning model. Method 600 may end after operations of block 640 complete or may repeat for a different set of received deployment instructions.

Proceeding now to FIG. 7, a flowchart of an embodiment of a method for using performance data collected from operation of a deployed version of a machine-learning model is shown. Method 700 may be performed by a computer system (e.g., computer system 101 in FIGS. 1-3) during or after operations of block 640 of method 600 are performed. In a similar manner as described above, computer system 101 may access a non-transitory, computer-readable medium having program instructions stored thereon that are executable by computer system 101 to cause the operations described in regards to FIG. 7. Referring collectively to FIGS. 1 and 7, operations of method 700 begin in block 710.

At block 710, method 700 includes providing, by computer system 101, performance data 130 associated with the operation of deployed version 116 of machine-learning model 115 to a user. In some embodiments, the providing includes retrieving, by computer system 101, performance data 130 from feedback repository 212 in FIGS. 2-4. In response to determining that at least a portion of performance data 130 is available for review, computer system 101 sends a notification of the retrieving to the user indicating that the portion of performance data 130 is available for review. Such a notification may include sending a message to an email address of the user and/or sending a text message to a mobile device associated with the user. The user may be capable of viewing performance data 130 in any suitable format, including for example, graphs and tables. Performance data 130 may also be available for comparison to other deployments of deployed version 116 or to other versions of machine-learning model 115.

Method 700 includes, at block 720, determining, by computer system 101 using performance data 130, that a performance level of deployed version 116 fails to satisfy a threshold level. In addition to providing performance data 130 to the user, performance data 130 is also used to determine whether a performance level of deployed version 116 meets a threshold performance level. The user may include one or more threshold values in deployment instructions 105. These threshold values may be determined by the user based on, for example, a target goal for machine-learning model 115, performance levels of previously deployed versions of machine-learning model 115, performance levels of other models that perform similar operation, or any other suitable benchmark. A performance level of deployed version 116 is determined using performance data 130 and then compared to the threshold values included in deployment instructions 105.

At block 730, method 700 further includes, in response to the determining, rolling back, by computer system 101, deployed version 116 of machine-learning model 115 to a different version stored in database 110. After determining that the performance level of deployed version 116 does not satisfy a threshold level, deployed version 116 is rolled back to a different version of machine-learning model 115 that is stored in database 110. In various embodiments, the different version may be, for example, a previously deployed version, another version that is currently deployed and satisfying the threshold levels, or a particular version identified in deployment instructions 105.

In addition to rolling back deployed version 116, computer system 101 may send a different notification to the user, wherein the different notification includes different types of alerts than the notification that the performance data is available for review. In some embodiments, this different notification may be sent in response to rolling back deployed version 116. In other embodiments, the different notification may be sent concurrently with the rolling back of deployed version 116, in response to the determining. The different notification may utilize a different type of alert than a notification that performance data 130 is ready for review. For example, the notification of data for review may be an email or test message as described above. Alerts for such an email or text message may correspond to a normal alert setting that is configured by the user. The different notification for a roll back of deployed version 116, however, may utilize a high priority email or text message alert. In some embodiments, the different notification may include a push notification to the mobile device of the user and include additional audible and/or vibration alerts to distinguish from the normal alert setting.

It is noted that the method illustrated in FIG. 7 is an example. After operations of block 730 complete, method 700 may repeat until the deployment of deployed version 116 ends. Although shown in a serial order, two or more of the operations of method 700 may be performed in a different order or in parallel. For example, operations of block 710 may continue to be performed while operations of block 720 are performed, thus allowing additional performance data to be collected and provided to the user while determining whether the performance level of the deployed version is compared to the threshold level.

Moving to FIG. 8, a flowchart of an embodiment of a method for deploying a different version of a machine-learning model is depicted. Method 800 may be performed by a computer system (e.g., computer system 101 in FIGS. 1-3, and 5) concurrent to performance of any operations of method 600. As described above, computer system 101 may access a non-transitory, computer-readable medium having program instructions stored thereon that are executable by computer system 101 to cause the operations described in regards to FIG. 8. Referring collectively to FIGS. 5 and 8, operations of method 800 begin in block 810, after version 115a of machine-learning model 115 has been deployed using deployment instructions 505a.

Method 800, at block 810, includes receiving, by computer system 101, different deployment instructions 505b for a different version 115b of machine-learning model 115. While version 115a is deployed in destination 120a as deployed version 516a, deployment instructions 505b are received by computer system 101 for deploying version 115b. The user may create and send deployment instructions 505a and 505b concurrently, or may create and send deployment instructions 505b after version 115a begins deployment to destination 120a. For example, the user may receive a first portion of performance data 530a indicating a particular performance characteristic of version 115a. The user may create version 115b in response and send deployment instructions 505b to deploy version 115b while version 115a is still deployed.

At block 820, method 800 also includes selecting, by computer system 101 and based on deployment instructions 505b, a different destination 120b within enterprise computer system 100 for deploying version 115b. Destination 120b provides access to data set 122b, which is different than data set 122a in destination 120a. Destination 120b may be selected by the user for a variety of reasons. For example, destination 120b may have additional bandwidth available for performing version 115b, while destination 120a does not have additional bandwidth. Destination 120b may provide access to a different type of data items in data set 122b than are available in data set 122a. Similarly, destination 120b may include a different type of hardware and/or software than is available in destination 120a. In other cases, destination 120b may be selected due to a similarity to destination 120a if destination 120a does not have bandwidth to perform both versions 115a and 115b.

Method 800 further includes, at block 830, scheduling, by computer system 101, a deployment of version 115b to destination 120b, wherein version 115b of machine-learning model 115 operates on data set 122b concurrent to version 115a operating on data set 122a. With both versions 115a and 115b deployed concurrently, both performance data 530a and 530b may be collected over a same time period, allowing the user to assess relative performance of the two versions without have to wait for the two versions to be deployed sequentially. This may further allow the user to create one or more additional versions of machine-learning model 115 based on feedback of the two deployed versions. In some cases, the user may choose to deploy a new version while version 115a or 115b, or both, are still deployed. Such management of version deployment may decrease a time frame for generating and releasing a production version of machine-learning model 115.

It is noted that method 800 is one example for demonstrating concurrent deployment of two or more versions of a machine-learning model. Method 800 may end after operations of block 830 complete, or may repeat for deployment of additional versions of the model.

Figure 9:
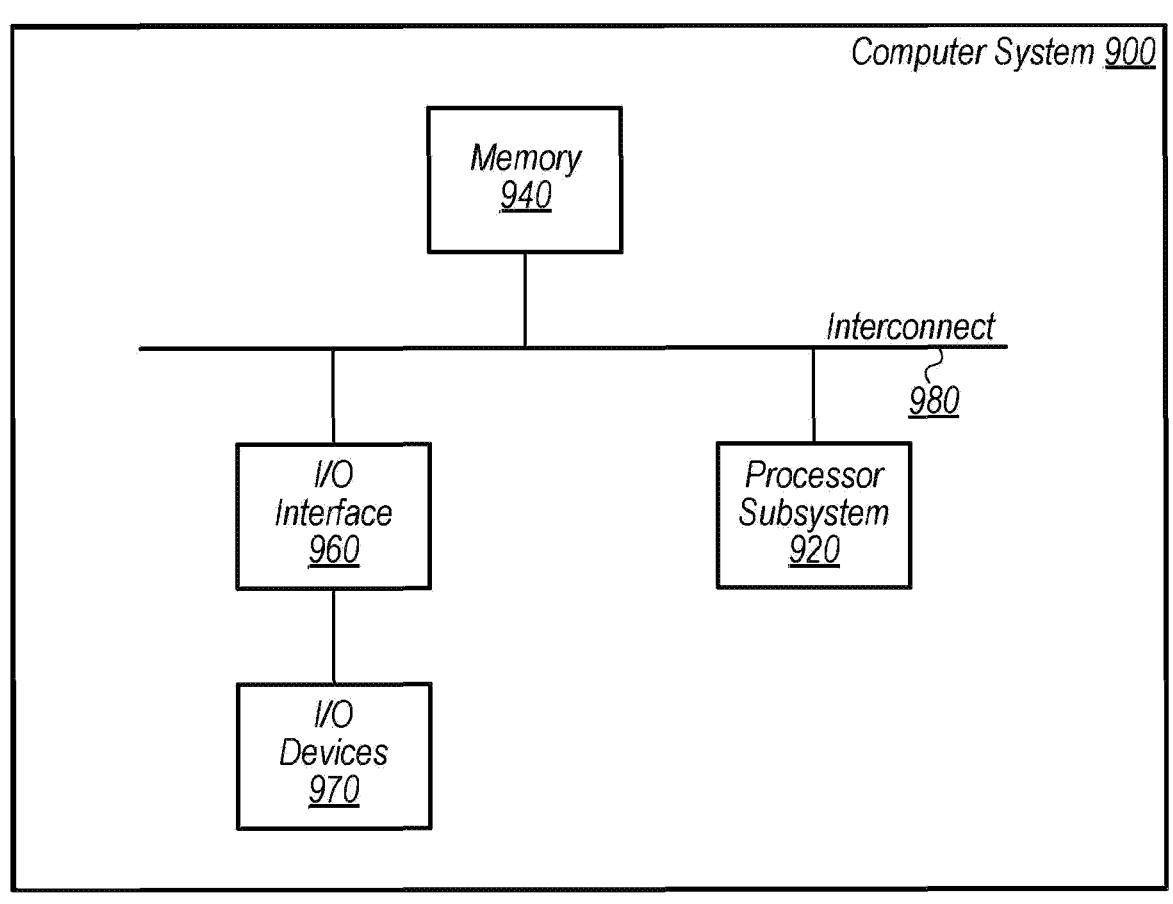
FIG. 9 is a block diagram illustrating an example computer system, according to some embodiments.

Referring now to FIG. 9, a block diagram of an example computer system 900 is depicted, which may implement one or more computing devices, such as computer system 101 in FIGS. 1-3, and 5, and/or other computer systems included in enterprise computer system 100. Computer system 900 includes a processor subsystem 920 that is coupled to a system memory 940 and I/O interface(s) 960 via an interconnect 980 (e.g., a system bus). I/O interface(s) 960 is coupled to one or more I/O devices 970. Computer system 900 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 900 is shown in FIG. 9 for convenience, computer system 900 may also be implemented as two or more computer systems operating together.

Processor subsystem 920 may include one or more processors or processing units. In various embodiments of computer system 900, multiple instances of processor subsystem 920 may be coupled to interconnect 980. In various embodiments, processor subsystem 920 (or each processor unit within 920) may contain a cache or other form of on-board memory.

System memory 940 is usable to store program instructions executable by processor subsystem 920 to cause computer system 900 to perform various operations described herein. System memory 940 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as system memory 940. Rather, computer system 900 may also include other forms of storage such as cache memory in processor subsystem 920 and secondary storage on I/O devices 970 (e.g., a hard drive, storage array, etc.). In some embodiments, these other forms of storage may also store program instructions executable by processor subsystem 920.

I/O interfaces 960 may be any of various types of interfaces configured to couple to and communicate with other devices, according to various embodiments. In one embodiment, I/O interface 960 is a bridge chip (e.g., Southbridge) from a front-side to one or more back-side buses. I/O interfaces 960 may be coupled to one or more I/O devices 970 via one or more corresponding buses or other interfaces. Examples of I/O devices 970 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 970 includes a network interface device (e.g., configured to communicate over Wifi, Bluetooth, Ethernet, etc.), and computer system 900 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "devices," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "processes" operable to perform designated functions are shown in the figures and described in detail above (e.g., user interface 325, model deployment platform 355, etc.). As used herein, the term "process" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A process may also be implemented in programmable hardware devices such as field programmable gate arrays, programmable array logic, programmable logic devices, or the like. A process may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:

a non-transitory memory; and one or more hardware processors coupled to the non-transitory memory and configured to read instructions from the non-transitory memory to cause the system to perform operations comprising:

receiving deployment instructions for training a machine-learning model of a plurality of machine-learning models stored in a database included in an enterprise computer system;

selecting, by a particular computer system included in the enterprise computer system and based on the deployment instructions, one of a plurality of security zones within the enterprise computer system for deploying a version of the machine-learning model for training, the selected security zone being associated with a subset of data sets available to the enterprise computer system and wherein the subset of data sets are protected by a respective set of data management rules that correspond to the selected security zone;

deploying the version of the machine-learning model to the selected security zone for operation on the subset of data sets within limits established by the respective set of data management rules;

training the machine-learning model based on the operation on the subset of data sets within the selected security zone;

collecting performance data associated with the operation of the version of the machine-learning model deployed on the selected security zone; and determining, based on the performance data, whether to roll back the version of the machine-learning model.

2. The system of claim 1, wherein the operations further comprise:

rolling back, based on the determining, the version of the machine-learning model by the particular computer system.

3. The system of claim 1, wherein the version of the machine-learning model is a first version of the machine-learning model, and wherein the operations further comprise:

selecting, by the particular computer system, a second version of the machine-learning model for subsequent deployment to the selected security zone.

4. The system of claim 3, wherein the operations further comprise:

deploying the second version of the machine-learning model to the selected security zone based on the deployment instructions.

5. The system of claim 1, wherein the version of the machine-learning model is a first version of the machine-learning model and the selected security zone is a first destination within the enterprise computer system, and wherein the operations further comprise:

selecting, by the particular computer system, a second version of the machine-learning model for parallel deployment to a second security zone; and deploying the second version of the machine-learning model to the second security zone for operation on a respective subset of data sets.

6. The system of claim 5, wherein the performance data is first performance data associated with the first version of the machine-learning model, and wherein the operations further comprise:

collecting second performance data associated with the operation of the second version of the machine-learning model deployed on the second security zone.

7. The system of claim 6, wherein the operations further comprise:

determining, based on the first performance data and the second performance data, whether to roll back one or more of the first version of the machine-learning model and the second version of the machine-learning model.

8. A method, comprising:

receiving deployment instructions for training a machine-learning model of a plurality of machine-learning models stored in a database included in an enterprise computer system deploying, by a particular computer system included in the enterprise computer system and based on the deployment instructions, a first version of the machine-learning model to a particular security zone of a plurality of security zones within the enterprise computer system for operation on a subset of data sets available in the particular security zone, wherein the subset of data sets are protected by a respective set of data management rules that correspond to the particular security zone;

training the machine-learning model based on the operation on the subset of data sets within limits established by the respective set of data management rules;

collecting performance data associated with the operation of the first version of the machine-learning model deployed on the particular security zone;

rolling back the first version of the machine-learning model based on the performance data; and deploying, by the particular computer system, a second version of the machine-learning model to the particular security zone for operation on the subset of data sets.

9. The method of claim 8, wherein rolling back the first version of the machine-learning model further comprises:

determining, based on the performance data, whether to roll back the first version of the machine-learning model.

10. The method of claim 8, further comprising:

selecting, by the particular computer system, the second version of the machine-learning model based on the performance data.

11. The method of claim 10, wherein the second version of the machine-learning model is a previously deployed version of the machine-learning model.

12. The method of claim 10, wherein the second version of the machine-learning model is selected as a most recently released version of the machine-learning model.

13. The method of claim 8, wherein the first version of the machine-learning model is deployed to the particular security zone in parallel with a plurality of versions of the machine-learning model being deployed to other ones of the plurality of security zones within the enterprise computer system.

14. A non-transitory machine-readable medium having instructions stored thereon that are executed by a computer system to perform operations comprising:

receiving deployment instructions for training a machine-learning model stored in a database included in an enterprise computer system;

selecting, by a particular computer system included in the enterprise computer system and based on the deployment instructions, a plurality of versions of the machine- learning model for deployment;

based on the deployment instructions, selecting, by the particular computer system, a plurality of security zones within the enterprise computer system for deploying the plurality of versions of the machine-learning model, each of the plurality of security zones being selected for a version of the machine-learning model and each security zone managing a respective subset of available data sets based on respective sets of data management rules;

deploying in parallel the plurality of versions of the machine-learning model to the plurality of security zones for operation on the respective subsets of data sets, wherein ones of the plurality of versions of the machine-learning model operate within limits established by corresponding ones of the respective sets of data management rules;

training the plurality of versions of the machine-learning model based on the operation on the respective subsets of data sets;

collecting performance data associated with the operation of the plurality of versions of the machine-learning model; and determining, based on the performance data, whether to roll back one or more versions of the machine-learning model of the plurality of versions of the machine-learning model.

15. The non-transitory machine-readable medium of claim 14, wherein the operations further comprise:

rolling back, based on the determining, the one or more versions of the machine-learning model by the particular computer system.

16. The non-transitory machine-readable medium of claim 14, wherein determining whether to roll back the one or more versions of the machine-learning model is based on the performance data of the one or more versions of the machine-learning model failing to satisfy a threshold performance value.

17. The non-transitory machine-readable medium of claim 14, wherein the operations further comprises:

selecting, based on the performance data, at least one subsequent version of the machine-learning model for subsequent deployment to at least one security zone of the plurality of security zones.

18. The non-transitory machine-readable medium of claim 17, wherein the operations further comprise:

deploying the at least one subsequent version of the machine-learning model to the at least one security zone based on the deployment instructions.

19. The non-transitory machine-readable medium of claim 17, wherein the at least one subsequent version of the machine-learning model is a previously deployed version of the machine-learning model.

20. The non-transitory machine-readable medium of claim 17, wherein the at least one subsequent version of the machine-learning model is a most recently released version of the machine-learning model.

* * * * *